United States Patent
Hulkkonen et al.

(10) Patent No.: US 10,531,437 B2
(45) Date of Patent: Jan. 7, 2020

(54) CONFIGURATION OF A SHARED FREQUENCY BAND BETWEEN WIRELESS COMMUNICATIONS SYSTEMS

(75) Inventors: Jari Yrjana Hulkkonen, Oulu (FI); Christian Menzel, Maisach (DE)

(73) Assignee: Nokia Solutions and Networks Oy, Espoo (FI)

( * ) Notice: Subject to any disclaimer, the term of this patent is extended or adjusted under 35 U.S.C. 154(b) by 816 days.

(21) Appl. No.: 14/398,832

(22) PCT Filed: May 4, 2012

(86) PCT No.: PCT/EP2012/058281
§ 371 (c)(1),
(2), (4) Date: Feb. 2, 2015

(87) PCT Pub. No.: WO2013/164037
PCT Pub. Date: Nov. 7, 2013

(65) Prior Publication Data
US 2015/0245333 A1    Aug. 27, 2015

(51) Int. Cl.
*H04W 72/04* (2009.01)
*H04W 16/14* (2009.01)
*H04W 76/10* (2018.01)

(52) U.S. Cl.
CPC ....... *H04W 72/0406* (2013.01); *H04W 16/14* (2013.01); *H04W 72/042* (2013.01);
(Continued)

(58) Field of Classification Search
CPC ...... H04W 72/04; H04W 88/08; H04W 76/00
See application file for complete search history.

(56) References Cited

U.S. PATENT DOCUMENTS

| | | | | |
|---|---|---|---|---|
| 5,655,217 A | * | 8/1997 | Lemson | H04B 7/0837 455/450 |
| 8,238,954 B2 | * | 8/2012 | Liu | H04W 72/082 375/267 |

(Continued)

FOREIGN PATENT DOCUMENTS

| | | |
|---|---|---|
| CN | 1224562 A | 7/1999 |
| CN | 1881828 A | 12/2006 |

(Continued)

OTHER PUBLICATIONS

International Search Report for International Application No. PCT/EP2012/058281, dated Feb. 6, 2013, 3 pages.

(Continued)

*Primary Examiner* — Hassan A Phillips
*Assistant Examiner* — Prenell Jones
(74) *Attorney, Agent, or Firm* — Brake Hughes Bellermann LLP (57) ABSTRACT

A receiving node of a first wireless communications system is co-located with a node of a second wireless communications system, said first and second wireless communications systems are configured with frequencies on a shared frequency band. Information identifying a node of the first wireless communications system transmitting on the shared frequency band is received. The received information identifying the transmitting node as an interfering node to the co-located node of the second wireless communications system is transmitted to an entity controlling configuration of the shared frequency band.

14 Claims, 2 Drawing Sheets

(52) U.S. Cl.
CPC ....... *H04W 72/0453* (2013.01); *H04W 76/10* (2018.02); *H04B 2201/692* (2013.01)

(56) References Cited

U.S. PATENT DOCUMENTS

| | | | | |
|---|---|---|---|---|
| 2002/0186710 | A1* | 12/2002 | Alvesalo | H04W 16/14 370/468 |
| 2004/0110467 | A1* | 6/2004 | Wang | H04B 7/18513 455/12.1 |
| 2005/0239497 | A1* | 10/2005 | Bahl | H04L 12/5692 455/552.1 |
| 2006/0252418 | A1* | 11/2006 | Quinn | H04W 16/10 455/423 |
| 2007/0109973 | A1* | 5/2007 | Trachewsky | H04W 16/14 370/252 |
| 2007/0264940 | A1* | 11/2007 | Ho | H04W 28/048 455/67.13 |
| 2008/0108365 | A1 | 5/2008 | Buddhikot et al. | |
| 2008/0299932 | A1* | 12/2008 | Belogolovy | H04L 27/2614 455/296 |
| 2009/0019150 | A1* | 1/2009 | Li | H04B 7/086 709/224 |
| 2009/0111463 | A1* | 4/2009 | Simms | H04W 16/14 455/424 |
| 2009/0170440 | A1* | 7/2009 | Eyuboglu | H04W 36/06 455/63.3 |
| 2009/0191906 | A1* | 7/2009 | Abedi | H04W 16/14 455/501 |
| 2009/0262785 | A1* | 10/2009 | Wilhelmsson | H04W 16/14 375/133 |
| 2009/0279457 | A1* | 11/2009 | Lucas | H04W 56/00 370/280 |
| 2010/0069013 | A1 | 3/2010 | Chaudhri et al. | |
| 2011/0090939 | A1* | 4/2011 | Diener | H04L 1/0001 375/136 |
| 2011/0092173 | A1* | 4/2011 | McCallister | H03F 1/3247 455/108 |
| 2011/0130098 | A1* | 6/2011 | Madan | H04W 24/02 455/63.1 |
| 2011/0130099 | A1* | 6/2011 | Madan | H04W 72/1226 455/63.1 |
| 2011/0170424 | A1* | 7/2011 | Safavi | H04L 43/0811 370/242 |
| 2011/0237243 | A1* | 9/2011 | Guvenc | H04L 5/0032 455/423 |
| 2011/0249627 | A1* | 10/2011 | Stanwood | H04L 12/413 370/328 |
| 2012/0034891 | A1* | 2/2012 | Chen | H03G 3/3078 455/214 |
| 2012/0230267 | A1* | 9/2012 | Sundaresan | H04W 72/06 370/329 |
| 2013/0294268 | A1* | 11/2013 | Xu | H04W 72/082 370/252 |
| 2013/0329692 | A1* | 12/2013 | Vrzic | H04W 72/0453 370/329 |
| 2014/0002211 | A1* | 1/2014 | Becker | A62C 35/60 333/239 |
| 2014/0011507 | A1* | 1/2014 | Bhattad | H04W 72/0406 455/450 |
| 2016/0286569 | A1* | 9/2016 | Trainin | H04W 72/04 |
| 2016/0301487 | A1* | 10/2016 | Frerking | H04H 20/423 |

FOREIGN PATENT DOCUMENTS

| | | |
|---|---|---|
| WO | 98/38821 A1 | 9/1998 |
| WO | 2007/122297 A1 | 11/2007 |

OTHER PUBLICATIONS

First Office Action for Chinese Application 201280074295.6, dated Jul. 19, 2017, 8 pages.

Search Report for Chinese Application 201280074295.6, dated Jul. 19, 2017, 2 pages.

* cited by examiner

CONFIGURATION OF A SHARED FREQUENCY BAND BETWEEN WIRELESS COMMUNICATIONS SYSTEMS

This application is a national stage entry of International Application No. PCT/EP2012/058281, filed May 4, 2012, entitled "Configuration of a Shared Frequency Band Between Wireless Communications Systems", which is hereby incorporated by reference in its entirety.

FIELD

The present invention relates to a configuration of a shared frequency band between wireless communications systems and more particularly to mitigation of interference between the wireless communications systems.

BACKGROUND

Specific frequency bands for each communications system are defined by cooperation of international and national regulatory bodies. With the increasing number of different communications systems it has become more difficult to define frequency bands dedicated for only one communications system.

Accordingly, it has been envisaged that some of the frequency spectrum may be used by several different communications systems. Authorized Shared Access (ASA) has been discussed in institutional authorities, e.g. CEPT, RSPG and EC. ASA provides a spectrum licensing scheme designed for the controlled secondary usage of the spectrum.

When several communications systems share a frequency band they will cause interference to each other. The amount of interference caused by one system to another depends on the configuration of the system, for example locations of transmitters, the used frequencies and the used transmission powers. This detailed level of information is only available from operators of the communications systems and regarded as critical to their business. Therefore, such information is very difficult to obtain.

BRIEF DESCRIPTION OF THE EMBODIMENTS

According to an aspect of the invention there is provided a method comprising configuring a receiving node of a first wireless communications system co-located with a node of a second wireless communications system, said first and second wireless communications systems are configured with frequencies on a shared frequency band, receiving information identifying a node of the first wireless communications system transmitting on a frequency of the first wireless communications system and transmitting to an entity controlling configuration of the shared frequency band between the first and the second wireless communications system information identifying the transmitting node as an interfering node to the co-located node of the second wireless communications system.

The method may further comprise protecting the node of the second wireless communications system communicating on a frequency of the shared frequency band from interference originating from the second wireless communications system by co-locating the receiving node of the first wireless communications system with the node of the second wireless communications system.

The transmitted information may include a measured signal strength of the transmitting node.

A configuration of a wireless communications system may comprise one or more licensed frequency bands of an operator of the wireless communications system.

According to an aspect of the invention there is provided a method comprising receiving information from a receiving node of a first wireless communications system identifying a transmitting node of the first wireless communications system as an interfering node to a node of a second wireless communications system co-located with the receiving node, wherein the said first and second wireless communications system are configured with frequencies on a shared frequency band, controlling configuration of the shared frequency band between the first and the second wireless communications system on the basis of the received information.

A shared frequency band according to the invention may comprise a plurality of frequency blocks, a first part of the blocks being used by the node of the second wireless communications system, and methods of the invention may further comprise:
  determining a second part of the blocks for a configuration of the first wireless communications system by removing the first part of the blocks and a protection mask associated with each block, and
  transmitting information identifying the second part of the blocks to the first wireless communications network.

According to an aspect of the invention there is provided a method comprising determining a first configuration of a first wireless communications system with frequencies on a shared frequency band with a second wireless communications system, receiving information identifying a transmitting node of the first wireless communications system as an interfering node to a node of the second wireless communications system, determining a second configuration of the first wireless communications system on the basis of the received information.

A configuration of the first wireless communications system may comprise frequencies associated with transmitting nodes of the first wireless communications system.

Methods according to the invention may comprise limiting the use of the shared frequency band by the transmitting node of the first wireless communications system on the basis of the received information.

A configuration of the first wireless communications system may further comprises a maximum transmission power of the transmitting node, and methods according to the invention may comprise limiting the maximum transmission power of the transmitting node.

The second configuration of the first wireless communications system may comprise configuration of the transmitting node with an operating frequency from another frequency band.

The shared frequency band according to the invention may comprise a plurality of frequency blocks, a first part of the blocks being used by the node of the second wireless communications system, and methods according to the invention may further comprise determining a second part of the blocks for a configuration of the first wireless communications system by removing the first part of the blocks and a protection mask associated with each block.

Frequency bands of the first wireless communications system may comprise the shared frequency band and a dedicated frequency band, and methods according to the invention may comprise determining a first configuration of a first wireless communications system with frequencies on a dedicated frequency band, and receiving information identifying a transmitting node of the first wireless communications system as an interfering node to a node of the second wireless communications system, and further determining a second configuration of the first wireless communications system with frequencies on a shared frequency band.

Frequency bands of the first wireless communications system may comprise the shared frequency band and a dedicated frequency band, and methods according to the invention may comprise determining a difference of propagation characteristics of the shared frequency band and the dedicated frequency band, and determining blocks of the shared frequency band for the second configuration on the basis of the determined difference.

Frequency bands of the first wireless communications system may comprise the shared frequency band and a dedicated frequency band and the shared frequency band may be on a higher frequency than the dedicated frequency band.

The first wireless communications system may comprise a plurality of receiving nodes, and method according to the invention may comprise obtaining at each receiving a node a received signal strength normalized between the plurality of receiving nodes, and transmitting the received signal strength to an entity controlling frequency allocations between the first and the second wireless communications system on the shared frequency band.

The first wireless communications system may comprise a plurality of receiving nodes each of which may comprise an omni-directional antenna.

A received signal strength from the transmitting node may be normalized with respect to the co-located node of the second wireless communications system, and methods according to the invention may comprise configuring the receiving node of the first wireless communications system with the same antenna characteristics as the co-located node of the second wireless communications system.

A received signal strength from the transmitting node may normalized with respect to the co-located node of the second wireless communications system, and methods according to the invention may comprise aligning an antenna direction of the receiving node of the first wireless communications system with the co-located node of the second wireless communications system.

The information identifying the transmitting node of the first communications system may comprise a cell identifier. The receiving node and the node of the second wireless communications system may be separated by a distance and a safety margin may be introduced to transmissions received from the transmitter of the first wireless communications system.

The first wireless communications system may comprise a Fixed Satellite System and the second wireless communications system may comprise a cellular communications system.

According to another aspect of the invention there is provided an apparatus comprising at least one processor, and at least one memory including computer program code, the at least one memory and the computer program code configured to, with the at least one processor, cause the apparatus at least to perform a method according to an aspect.

According to another aspect of the invention there is provided an apparatus comprising means configured to perform a method according to an aspect.

According to another aspect of the invention there is provided a computer program product comprising executable code that when executed, cause execution of functions of a method according to an aspect.

According to another aspect of the invention there is provided a system comprising one or more apparatuses according to an aspect.

In a system according to the invention a receiving node of a first wireless communications system may be co-located with a node of a second wireless communications system, said first and second wireless communications systems may be configured with frequencies on a shared frequency band and configured on a vehicle.

In a system according to the invention the receiving node and the node of the second wireless communications system may be separated by a distance determined on the basis of a speed of the system, said speed may preferably be less than equal to 200 km/h.

In a system according to the invention a receiving node of a first wireless communications system may be co-located with a node of a second wireless communications system, and may be positioned within a range of 1% of a maximum transmission range of the transmitting node of the first wireless communications system.

Although the various aspects, embodiments and features of the invention are recited independently, it should be appreciated that all combinations of the various aspects, embodiments and features of the invention are possible and within the scope of the present invention as claimed.

Some embodiments may provide mitigation of interference between wireless communications systems operating on a shared frequency band.

Some embodiments may provide mitigation of interference between wireless communications systems operating on a shared frequency band without sharing configurations of any of the wireless communications systems.

Further advantages will become apparent from the accompanying description.

BRIEF DESCRIPTION OF THE DRAWINGS

In the following the invention will be described in greater detail by means of preferred embodiments with reference to the accompanying drawings, in which.

DETAILED DESCRIPTION OF THE EMBODIMENTS

Some embodiments support secondary spectrum usage concepts e.g. Authorized Shared Access (ASA) or Licensed Shared Access (LSA) which provide that a cellular system can use the spectrum that is primarily used by another communications system, e.g. FSS. However, it must be ensured that the cellular system is not causing harmful interference towards a primary system, the FSS. The primary system may also other systems including a broadcast system, a radio astronomy system, for example.

In some embodiments a shared frequency band is used to refer to the spectrum of PS that is co-used by another wireless communications system on an interference-avoidance basis. The wireless communications system co-using the shared frequency band with the PS, uses its own, non-shared spectrum to estimate the interference potential to the secondary system, if it would transmit in the shared spectrum. This non-shared spectrum is referred to as a dedicated spectrum.

Some embodiments provide co-using of a frequency band allocated to a wireless communications system, e.g. PS, thereby turning the frequency band into a shared frequency band.

Figure 1:
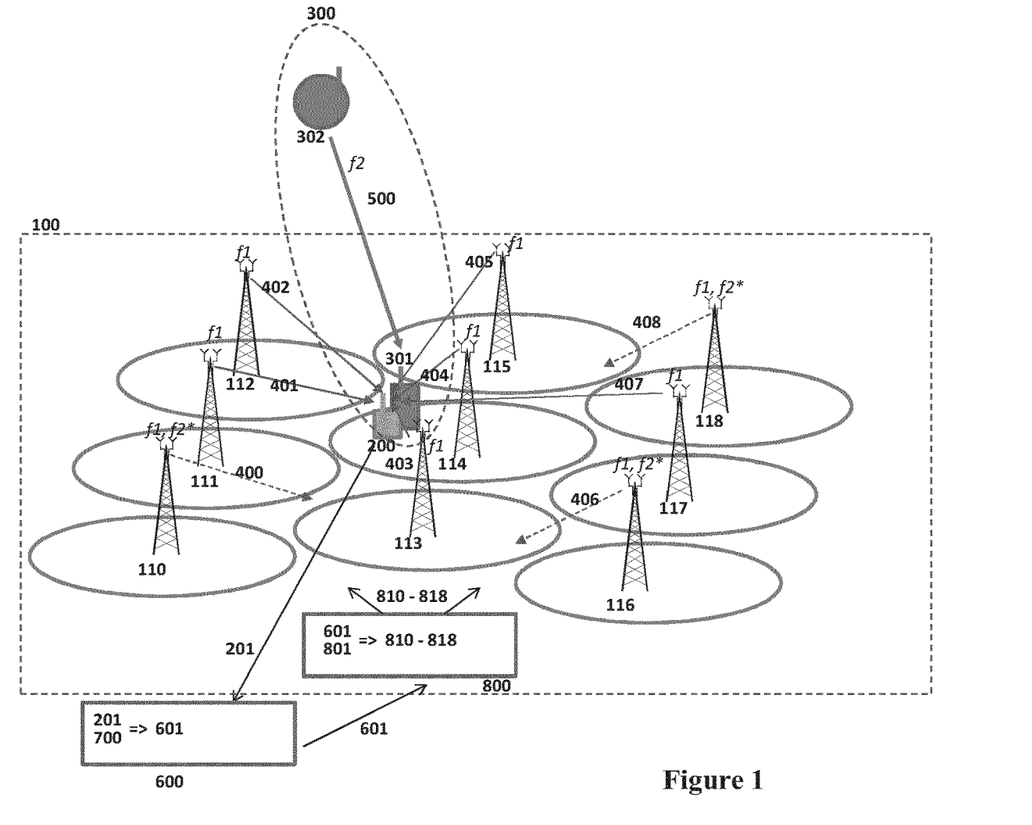
FIG. 1 illustrates an architectural view of wireless communications systems configured with nodes on a shared frequency band according to an embodiment.

FIG. 1 illustrates an architectural view of wireless communications systems 100, 300 configured with nodes on a shared frequency band according to an embodiment. Only some elements and functional entities of the communications systems are shown, all being logical units whose physical implementation may differ from what is shown.

In an embodiment the wireless communications systems 100 comprises a cellular mobile communications system and the wireless communications systems 300 comprises a fixed satellite communications system (FSS). The cellular mobile communications system and the FSS operate on a shared frequency band. A shared frequency band may be licensed to be used by communications systems employing different communications technologies, e.g. in the example of FIG. 1 the cellular mobile communications system and the FSS operating on the shared frequency band. A shared frequency band may also be shared by communications systems employing the same communications technologies, e.g. the communications systems sharing the frequency band being both cellular communications systems.

Examples of cellular communications systems comprise a Global System for Mobile Communications (GSM) network, 3rd generation mobile communications (3G) network, Long Term Evolution (LTE) network and LTE-advanced (LTE-A).

In an embodiment a wireless communications system is considered to have a higher priority over another wireless communications system operating on a shared frequency band. In the following, the higher priority wireless communications system will be referred to as a primary system (PS) and a communications system having a lower priority with respect to another communications system will be referred to a secondary system (SS). If more than two networks are operating on the shared frequency band, more priorities may be used to create a hierarchy between the wireless communications systems. Accordingly, the hierarchy may include more than two levels, e.g. three, four, or any number of levels. The priority of a wireless communications system determines its protection on the shared frequency band. The higher priority communications system is protected from interference from a lower priority communications system on the shared frequency band.

A communications system having a higher priority in the use of a shared spectrum than another determines their relationship considering which of the communications systems is considered to cause interference on a shared frequency band used by both of the communications systems. Accordingly, transmissions from a secondary system transmitter received at a node of a primary system, i.e. primary system station (PSS), are regarded as interference. Mitigation of the interference from a transmitter of a SS to a PSS is explained in the following embodiments.

FIG. 1 illustrates a PSS (301) (e.g. FSS) co-located with a receiver of a secondary system (200), hereinafter referred to as a secondary sensor. The PSS and secondary sensor may be configured in a single device or they may be separate devices. When they are deployed separately, the distance between the PSS and secondary sensor determine the efficiency of determining interference from the secondary system to the PS and the co-located PSS. Thereby, to have accurate information of interference from the SS to the PSS, the PSS and secondary sensor should be co-located to have minimum difference at properties of the signal received from the SS. The distance between the co-located separate devices causes a difference between properties of radio signals received at the devices. With a too large distance between the co-located devices, determining the interference caused by the secondary system to the PSS may become difficult due to difference of radio environments of the co-located devises, e.g. different propagation experienced by the received signal from the secondary system at each of the co-located devices. Thereby, a suitable distance between the co-located devices depends a lot about the environment, frequency, system, network plan etc. In one example the co-locate devise are positioned within a range of 1% of a maximum transmission range of the transmitter of the SS to provide information with sufficient accuracy to be used in determining interfering transmitters to the PSS. The transmission range of the transmitter that is considered, is preferably a transmitter that has a coverage area enclosing the PSS and the co-located secondary sensor.

In embodiments comprising separate co-located devices of a PSS and a secondary sensor, properties of the signal received signal differ from each other compared to a situation of the devices being embodied in a single apparatus and receiving the signal from the SS using common means, e.g. a common antenna. The difference can be considered as an error in the received signal of the secondary sensor compared to the received signal at the PSS. In embodiments with separate co-located devices a safety margin may be introduced to the measurements of the interfering transmitters of the SS. The safety margin may be e.g. an expected error of the received signal strength measured at the secondary sensor. The safety margin may comprise e.g. a dB value. The safety margin may be introduced at the secondary sensor, whereby the number of interfering transmitters reported to the spectrum controller is reduced. It should be appreciated that the safety margin may also be implemented in the spectrum controller or the management entity of the SS. By the introduction of the safety margin, the error between the receive signals at the co-located devices may be compensated for and detection of the interference from the SS to the PSS may be improved.

The SS includes transmitters 110 to 118, e.g. base stations or Node-Bs that may be configured with operating frequencies from one or more frequency bands available to the SS by a management entity 800. The management entity is typically provided by an operations and management system performing the configuration of the transmitters with operating frequencies, i.e. frequency planning. Typically the available frequency bands comprise frequency bands licensed to be used by a specific wireless communications system. In the embodiments, the shared frequency band is licensed to be used by a plurality of wireless communications systems. The license may be specified to an operator of the communications system. In an embodiment the SS is configured with a single frequency band f2 that is a shared frequency band between wireless communications systems. In another embodiment, the SS is configured with a frequency band f2 that is a shared frequency band between wireless communications systems and a dedicated frequency band f1. By being configured with a plurality of available frequency bands, the SS may configure the transmitters 110 to 108 or a part of the transmitters with operating frequencies from the frequency band f1 if one or more of the transmitters cause interference to the PS. The PS includes a transmitter 302, e.g. a FSS satellite, configured to communicate with the PSS on a shared frequency band f1 between the PS and FSS.

A spectrum controller 600 of the shared frequency band communicates via connection 201 with the secondary sensor. The connection 201 may be a direct connection or involve an intermediate network. The spectrum controller may also be connected to the secondary sensor via an operations and maintenance system of the SS. A connection 601 between the operations and maintenance system and the spectrum controller provides communicating a determined configuration of the shared frequency band to the operations and maintenance system to be used in frequency planning of the SS.

The transmitters 110-118 of the SS are connected to the management entity by respectively numbered connections 810 to 818.

The connections 201, 601 and 810-818 may be wired or wireless connections. The wired connections may be implemented for example using Asynchronous Transfer mode (ATM), Ethernet, E1 or T1 lines. The wireless connections may be implemented by TETRA (Terrestrial Trunked Radio), LTE (Long Term Evolution), LTE-Advanced (LTE-A), GSM (Global System for Mobile Communications), WCDMA (Wideband Code Division Multiple Access), WLAN (Wireless Local Area Network), WiMAX (Worldwide Interoperability for Microwave Access), IEEE 802.11 based Wireless Local Area Network (WLAN) standard, or any other suitable standard/non-standard wireless communication means.

In an embodiment a PSS is co-located with a plurality of secondary sensors. In this way a plurality of measurements may be obtained regarding interference from the SS at the PSS.

It should be appreciated, that more than one PSS or even all the PSS of the PS may be co-located with one or more secondary sensors to determine interference from the SS to the PSS.

In an embodiment the PSS and a secondary sensor are provided as a single device, whereby the secondary sensor and the PSS employ the same antenna. In one example such a device implements a capability to communicate with the PS and a capability to communicate with the SS. Examples of the PS and the SS implemented in the same device include WiMax and UMTS (Universal Mobile telecommunications System,), GSM and WCDMA (Wideband Code Division Multiple Access), and TETRA (Terrestrial Trunked Radio) and GSM, for example.

In an embodiment the PSS and a secondary sensor are provided as separate co-located devices, whereby the secondary sensor and the PSS employ their own antennas. When SS comprises a plurality of secondary sensors the may be equipped with an omni-directional antenna to facilitate comparing signal strengths between the secondary sensors. In another example, a received signal strength from transmitting node of the SS is normalized with respect to the co-located PSS. The normalization may comprise configuring the secondary sensor with the same antenna characteristics as the co-located PSS. The antenna characteristics may include one or more from a group comprising: an antenna direction and a gain.

In an embodiment, a TETRA communications system is configured to operate on a shared frequency band with another wireless communications system. TETRA is a communications technology used in professional radio networks for secure and reliable communications. Accordingly, conventionally sharing the TETRA frequency with another communications system would be an undesirable option. However, setting the TETRA communications system as PS protects it from interference from SS systems on the shared frequency band. In this way use of a shared frequency band for a TETRA communications system may be facilitated.

Figure 3:
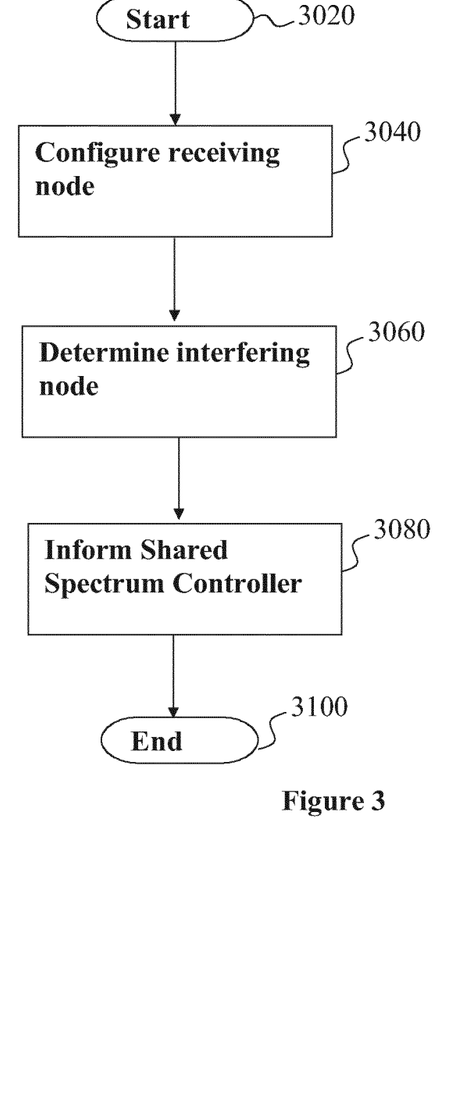
FIG. 3 illustrates a method of providing information of interference to an entity controlling configuration of a shared frequency band according to an embodiment.
Figure 4:
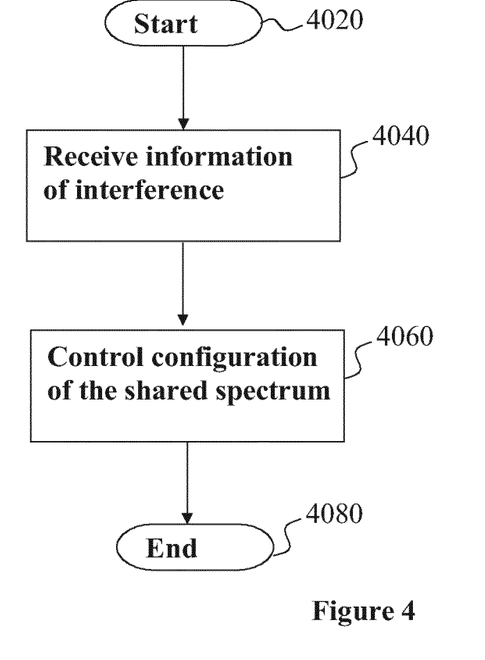
FIG. 4 illustrates a method of controlling configuration of a shared frequency band according to an embodiment.
Figure 5:
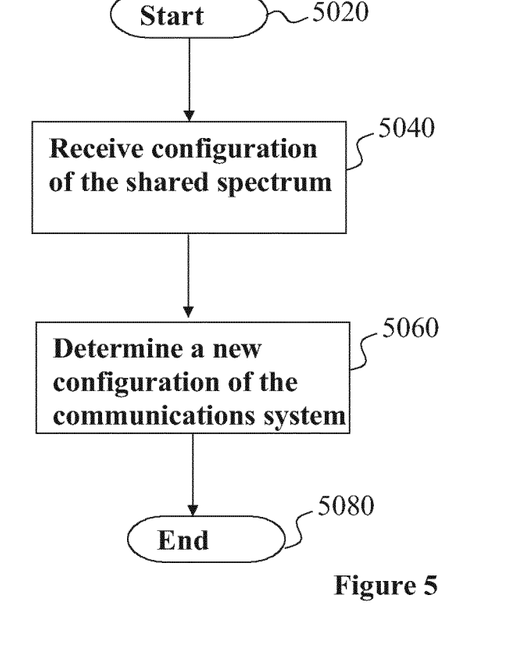
FIG. 5 illustrates a method of determining a new configuration of a wireless communications system operating on a shared frequency band according to an embodiment.

In the following, operation of the spectrum controller 600, management entity 800 and the secondary sensor will be explained by referring to FIGS. 3, 4 and 5 together with FIG. 1. FIGS. 3, 4 and 5 describe operations of apparatuses according to embodiments. FIG. 3 illustrates a method of providing information of interference to an entity controlling configuration of a shared frequency band according to an embodiment. The method of FIG. 3 may be performed by the secondary sensor 200. FIG. 4 illustrates a method of controlling configuration of a shared frequency band according to an embodiment. The method of FIG. 4 may be performed by the spectrum controller 600. FIG. 5 illustrates a method of determining a new configuration of a wireless communications system operating on a shared frequency band according to an embodiment. The method of FIG. 5 may be performed by the management entity 800. The methods of FIGS. 3, 4 and 5 start at 3020, 4020 and 5020 when a secondary sensor 200 of the SS is co-located with a PSS 301 of PS, said PS and SS being configured with frequencies f2 on a shared frequency band.

The configuring of the wireless communications systems may comprise an operator of a wireless communications system being licensed one or more frequencies on a frequency band or a plurality of frequency bands. The devices deployed in the wireless communications system have thereby capability to operate on the frequencies licensed to the operator. In an embodiment, the transmitters of the SS operate on the shared frequency band frequencies f2. The secondary sensor operates on the same frequencies f2 as the transmitters of the SS and receives the transmissions from the transmitters.

In another embodiment, the transmitters of the SS operate on a dedicated frequency of the SS and a shared frequency band. The configuration defined to each transmitter defines frequencies define frequencies that are used in transmitting radio signals. The frequencies may be defined from one of the shared or dedicated frequency band or from both of the frequency bands.

In an embodiment a transmitter of the SS transmits information that identifies it so secondary sensor receiving the information 3040. This information may comprise a cell identifier for example. A cell identifier may be transmitted on a common channel of the SS, thereby being receivable to all nodes of the SS within a reception range of the transmitters of the SS. The receiving of downlink common channel from the transmitters of the SS may be performed by performing measurements of nearby base station as is conventional in cellular networks. By receiving the information from the transmitters, the secondary sensor may keep an up to date list of the transmitters from which it is able to receive a radio signal.

Since the secondary sensor is co-located to the PSS, the transmitters identified by the information received at the secondary sensor are determined 3040 as potentially interfering nodes to the co-located PSS, and the spectrum controller 600 is informed about these potentially interfering transmitters by transmitting the information identifying the transmitters to the spectrum controller 600. The method of the secondary sensor ends 3100 after informing the spectrum controller. In an embodiment the potentially interfering transmitters are considered as interfering transmitters.

The spectrum controller receives 4040 the information identifying transmitters of the SS. Based on the received information, the spectrum controller determines identified transmitters as interfering nodes to PSS co-located with the secondary sensor.

The spectrum controller controls 4060 configuration of the shared frequency band between PS and SS on the basis of the received information. Since the PSS and secondary sensor are co-located, the spectrum controller is able to identify interfering transmitters reported by the secondary sensor as associated to the specific PSS that is co-located to the secondary sensor. On the basis of the received information identifying transmitters of the SS and with information about the spectrum resources of the shared frequency band used by the PSS co-located to the transmitters, the spectrum controller may determine restricted frequencies per each transmitter of the SS. The spectrum resources may be determined as blocks of frequencies each comprising one or more frequencies. The information of restricted frequencies may be sent to an entity that is responsible of the configuration of the SS, e.g. an operations and management system. The spectrum controller may additionally have information have information about the required protection mask to be used for the frequencies allocated to PSSs, whereby this information may be further used to restrict the use of the shared frequency band at the SS.

The information of restricted frequencies may be provided as a list of restricted shared frequency band frequencies that is transmitted 4060 to an entity of the PS. In one example the entity receiving the list is the operations and maintenance system performing frequency planning of the PS.

The method of the spectrum controller ends 4080 after the received 404 information is processed 4060 to determine the restricted frequencies to the SS.

The transmitters of the SS operate on the frequencies determined by the management entity 800 in a configuration of the SS 6020. The management entity 800 receives 5040 information identifying a transmitter of the SS as an interfering node to a node of the second wireless communications system. In an embodiment the received information comprises the restriction list generated by the spectrum controller and identifying restricted frequencies associated with a specific transmitter.

The management entity determines a new configuration of the SS on the basis of the received information. The new configuration may comprise a frequency plan of the SS including information of operating frequencies of the transmitters of the SS.

In an embodiment the management entity limits the use of the shared frequency band by the transmitters identified in the received information.

In an embodiment a configuration of the SS comprises a maximum transmission power associated with each transmitter, whereby the maximum transmission power of the transmitters identified in the received information is limited. The maximum transmission power may be determined as an absolute value of the transmission power or as a relative value. The absolute value may be defined in Watts or dBms, for example.

The relative value may be determined as a change to be applied to the current transmission power and may be expressed as dBs, for example. Examples of changes to the maximum transmission power include −3 dB, −6 dB and −10 dB. The changes to be applied to the maximum transmission power may be applied stepwise by limiting the transmission power by steps of the above dB values. The number of steps may be chosen 1, 2, 3 or any integer number. The stepwise limitation may be performed e.g. in the management entity of the SS in response to receiving information identifying an interfering transmitter from the spectrum controller. It should be appreciated that for a high protection against interference the step size should be set high, e.g. −10 dB in the above example. However, in some embodiments the stepwise adaptation of the maximum transmission power may be omitted by limiting the maximum transmission power to 0 W or preventing the use of the shared frequency band or a part of the shared frequency band of the interfering transmitter by configuration of the SS.

In an embodiment the determining a new configuration of the SS may comprise transmitting to a transmitter of the SS a new configuration comprising maximum transmission power associated with the transmitter. The transmission may be performed for all or only a part of the transmitters.

If, after limiting the transmission power, a further communications from the spectrum controller is received regarding the same transmitter interfering, the transmitter may completely restricted from transmitting on the shared frequency band. In this way, interference experienced by the PSS at the edges of the reception range of the SS transmitters may be mitigated without restricting to the use of the shared frequency band by the SS transmitter.

In an embodiment available frequency bands of the SS comprise a dedicated frequency band in addition to the shared frequency band, whereby the management entity may determine a new configuration of the SS, where a transmitter identified in the received 6040 information may be configured a frequency on the dedicated frequency band. In this way the interfering transmitter may operate on another frequency band that is separate from the shared frequency band to mitigate interference to the PSS.

In an embodiment available frequency bands of the SS comprise a dedicated frequency f1 band in addition to the shared frequency band f2, whereby the management entity determines a difference of propagation characteristics of the shared frequency band and the dedicated frequency band, and determines blocks of the shared frequency band for a new configuration on the basis of the determined difference. The propagation characteristics of the dedicated frequency band may be obtained by a secondary sensor of the SS making measurements on both frequency bands, and the results being delivered to the management entity. Preferably the dedicated frequency band that is used for the measurements by the SS is at lower frequency than the shared frequency band. In this way, when the transmitters of the SS are not yet configured with frequencies from the shared spectrum, measurements of the received signal strength at the secondary sensor on the dedicated frequency band provide the spectrum controller 600 with information of all possible interfering transmitters of the SS associated with each PSS. Due to the shared frequency band being on a higher frequency band than the dedicated frequency band, transmission on the shared frequency band attenuate faster. Accordingly, since the possible interferers are identified by their received signal strengths at secondary nodes on a higher frequency band, their use of the shared frequency band is limited by the spectrum controller 4060. Then, when a new configuration including frequencies from the shared frequency band is determined 5060 by the management entity, the use of the shared frequency band to the transmitters to most likely interfere can be limited or even restricted, before any interference occurring. Due to the propagation characteristics of higher frequencies attenuating faster with distance than lower frequencies, the likelihood of the SS transmitters causing interference to the PSSs may be kept small.

In an embodiment SS comprises a plurality of secondary sensors. At each secondary sensor received signal strength from SS transmitter is obtained 3040, whereby the signal strength is normalized between the plurality of secondary sensors. The normalization may be provided by the secondary nodes equipped with antennas of similar characteristics, e.g. with omni-directional antennas. The secondary nodes transmit 3080 the information of the received signal strength to the spectrum controller to be used in configuration 4060 of the shared frequency band.

In an embodiment received signal strength from SS transmitter is obtained 3040, whereby the signal strength is normalized with respect to the co-located node of the PSS by configuring the secondary sensor with the same antenna characteristics as the co-located PSS. The normalization with respect to the PSS may comprise aligning an antenna direction of the secondary sensor with the co-located PSS.

In an embodiment a PS comprises an FSS 300 and a SS comprises a cellular system 100. A secondary sensor measures 3060 cellular system downlink (DL) common channels and identifies base stations from which it is able to receive the DL signal. These identified cellular system base stations are potential interfering base stations towards that particular FSS earth station receiver. This information is sent to a spectrum controller 600.

The spectrum controller has information of the FSS spectrum usage and therefore it is able to generate a list 601 of base stations where FSS spectrum (or certain part of FSS spectrum) must not be used. This information is send to the management entity 800.

Cellular system management is making frequency planning of the use of the shared frequency band on the basis of the secondary spectrum restriction list 601 from the spectrum controller. This secondary spectrum plan information is then provided 810-818 to the cellular system base stations 110-118, which then can start to use secondary spectrum to achieve more capacity.

In an embodiment including FSS as PS 300 and a cellular mobile system 100 as SS, where the cellular mobile system has dedicated spectrum f1 that is used in the base stations 110-118. All base stations are transmitting DL common channels on f1 (DL signals 400-408) which mobile devices in that network are listening (this is normal operation in the cellular systems).

FSS system 300 is operating on a frequency band f2. The frequency bands f1 and f2 may be divided into sub-blocks so that only part of the each frequency band spectrum is used per base station or FSS link. Satellite 302 is transmitting signal 500 on frequency f2 towards FSS earth station 301.

In an embodiment a secondary sensor 200 is co-located with a PSS, e.g. an FSS earth station 301. The secondary sensor measures 3060 downlink transmissions from a SS, e.g. a cellular system, on a dedicated frequency band of the cellular system. From these measurements 401, 402, 403, 404, 405 and 407 potential interfering base stations (or cells) are identified 3060 and this information is provided 3080 to the spectrum controller. Typically the potential interfering transmitters 200, e.g. base stations are close to the secondary sensor 200 and/or base stations transmitting with high power and/or base stations which antenna is directing towards the secondary sensor. In the example of FIG. 1, the potentially interfering base stations are the base stations 110, 112, 113, 114, 115 and 117.

Since the DL signals are received in a location where FSS earth station receiver is placed, these base stations are potential interfering base stations towards the PSS 301, i.e. they would cause harmful interference to 301 if transmitting on the same spectrum than FSS. Therefore, those base stations must not use FSS spectrum f2. The secondary sensor 200 is providing a list of identified interfering base stations to the element 600 that is taking care of spectrum control on the shared frequency band. Spectrum controller 600 has now the table of potential interfering base stations. Moreover, it has also knowledge of the FSS stations and used frequencies in FSS system 700. By combining the information received from the secondary sensor with the knowledge of the FSS stations and used frequencies in FSS system, the spectrum controller 600 is able to calculate restrictions for the secondary spectrum usage. The restrictions may be represented as a list including identified interfering base stations and restricted frequencies/spectrum blocks per interfering base station. This list is delivered to the management entity 800. From the list 601 and cellular network plan 801 the management entity 800 is able to identify the base stations which are allowed to use f2 (or the sub-blocks of f2). Now, management entity 800 is able to make new frequency plans 810-818 for all its base stations. Then, the management entity 800 is delivering the frequency plans 810-818 to the base stations. After that the base stations can start transmission on f2. In an embodiment an arrangement of a co-located secondary sensor and a PSS provide identifying one or more interfering transmitters of the SS. It should be appreciated that the identified transmitters may not always interfere, e.g. if transmissions on the shared frequency band happen at different times or interference is avoided by using of efficient coding. Accordingly, the interfering transmitter may be regarded as interfering when operating on the same frequency band and being identified by the secondary sensor. Indeed, in some occasions, the interfering transmitters of the SS may not cause interference, although operating on the same frequency band as the co-located PSS. However, such transmitters are still regarded interferers as potentially causing interference, due to the use of the same band making it likely that the PSS will be interfered by the SS, e.g. when transmissions from the PS and SS collide at the PSS.

In an embodiment the PSS and secondary sensor are installed in a moving apparatus, e.g. a vehicle. The vehicle may be a car, or a train for example. Due to the movement the radio environment of the PSS changes. However, since the secondary sensor and PSS being installed on a fixed distance on the moving apparatus, the secondary sensor provides protection to the PSS, while moving. Characteristics of the movement e.g. speed may be used to determine the distance between the co-located PSS and secondary sensor. For example, considering installing the PSS and secondary sensor on a train, the maximum travel speed of the train may be used to determine the distance between the PSS and secondary sensor to provide a minimum difference at properties of the signal received from the SS. When installing the PSS and secondary sensor on a car, the speed limits used in a corresponding geographical area may be considered in determining the distance between the PSS and secondary sensor. In one embodiment, a speed of 200 km/h is used to determine a distance between the PSS and secondary sensor, since speed limits are in most areas much lower than 200 km/h, e.g. 130 km/h or 120 km/h. By determining the distance between the PSS and the secondary sensor using the 200 km/h speed, the distance involves a safety margin to mitigate the differences of the received signal at the secondary sensor and the PSS which could be caused by e.g. variances of the radio environment caused by exceeding the speed limit and/or changes between different areas, such as rural and urban areas.

An embodiment comprises an SS, a mobile system, and a PS, an FSS. One or more secondary sensors are co-located as described above with FIG. 1. The base stations of the mobile system are configured to operate on frequencies of a dedicated spectrum f1 and only secondarily on frequencies of a shared spectrum f2. The shared spectrum may be used as a capacity extension, for example. Accordingly, the mobile system may be only using f1, whereby the secondary sensors produce information about interfering or potentially interfering base stations to the spectrum controller. In this way, information may be available about interfering and potentially interfering base stations before the frequencies of the shared frequency band are configured to the base stations as operational frequencies. It should be appreciated that the above described embodiments may be applied also to configurations of PS and SS, where only shared frequency band is used for communications in both communications systems, as well as with the SS employing both a shared frequency band and a dedicated frequency band for communications.

Figure 2:
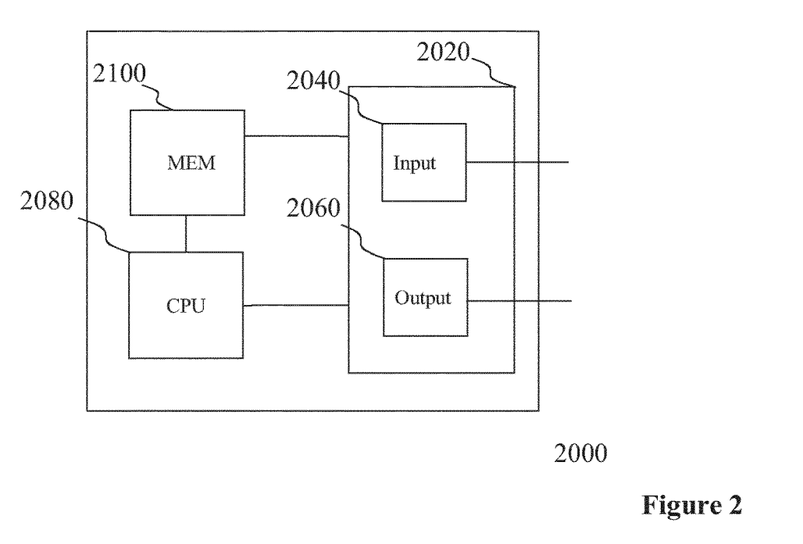
FIG. 2 illustrates an apparatus according to an embodiment.

FIG. 2 is a block diagram of an apparatus 2000 according to an embodiment of the invention. The apparatus may comprise an entity controlling a shared frequency band, a management entity, or a secondary sensor described in the embodiments. Although the apparatus has been depicted as one entity, different modules and memory may be implemented in one or more physical or logical entities. Examples of the apparatus include but are not limited to UE, a mobile phone, communicator, PDA, application server or a computer.

The apparatus 2000 comprises an interfacing unit 2020, a central processing unit (CPU) 2080, and a memory 2100, that are all being electrically interconnected. The interfacing unit comprises an input 2040 and an output unit 2060 that provide, respectively, the input and output interfaces to the apparatus. The input and output units may be configured or arranged to send and receive data and/or messages according to one or more protocols used in the above-mentioned communication standards. The memory may comprise one or more applications that are executable by the CPU.

In an embodiment, where the apparatus comprises a secondary sensor, the configuration of the interfacing unit may be determined according to the characteristics of other secondary sensors, e.g. to employ an omni-directional antenna, and/or according to a co-located PSS, to align the antenna direction and/or gain with the PSS.

The CPU may comprise a set of registers, an arithmetic logic unit, and a control unit. The control unit is controlled by a sequence of program instructions transferred to the CPU from the memory. The control unit may contain a number of microinstructions for basic operations. The implementation of microinstructions may vary, depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions. The memory may be a volatile or a non-volatile memory, for example EEPROM, ROM, PROM, RAM, DRAM, SRAM, firmware, programmable logic, etc.

An embodiment provides a computer program embodied on a distribution medium, comprising program instructions which, when loaded into an electronic apparatus, cause the CPU to perform according to an embodiment of the present invention.

The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital computer or it may be distributed amongst a number of computers.

The apparatus 200 may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus 200, necessary processing capacity, production costs, and production volumes, for example.

In an embodiment the input unit may provide circuitry for obtaining data, signaling, signaling messages and/or transmissions to the apparatus. The obtaining may comprise receiving radio frequency signals from an antenna, for example. In another example the obtaining may comprise receiving baseband signals from an RF unit. Accordingly, data, signaling, signaling messages and transmissions in embodiments of the present disclosure may be provided as RF signals or baseband signals.

In an embodiment the output unit may provide circuitry for transmitting data, signaling, signaling messages and/or transmissions from the apparatus. The transmitting may comprise transmitting radio frequency signals from an antenna, for example. In another example the transmitting may comprise transmitting baseband signals to an RF unit. Accordingly, data, signaling, signaling messages and transmissions in embodiments of the present disclosure may be provided as RF signals or baseband signals.

It should be appreciated that in an embodiment, the one or more parts described in the apparatus 200 may be provided as separate physical entities.

For example, according to an embodiment, the interfacing unit may be provided as a separate unit that constitutes a transmission point that communicates on RF communications signals on a communications channel and on baseband frequency communications signals on a connection to a centralized baseband processing unit. The interfacing unit may provide transmission or reception, or both transmission and reception of RF signals on the communications channel and/or on the connection to the centralized baseband processing unit.

The functions and/or steps in FIGS. 3, 4, and 5 may be implemented as any kind of processor programmable to execute numeric calculations such as an embedded processor, a Digital Signal Processor (DSP), a Master Control Unit (MCU) or an Application Specific Integrated Processor (ASIP). An apparatus according to an embodiment may also be implemented as an electronic digital computer, which may comprise a working memory (RAM), a central processing unit (CPU) or a processor, and a system clock. The CPU may comprise a set of registers, an arithmetic logic unit, and a control unit. The control unit is controlled by a sequence of program instructions transferred to the CPU from the RAM. The control unit may contain a number of micro-instructions for basic operations. The implementation of microinstructions may vary, depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

An embodiment provides a computer program embodied on a distribution medium, comprising program instructions which, when loaded into an electronic apparatus, constitute the apparatus according to an embodiment described earlier.

The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital computer or processor or it may be distributed amongst a number of computers or processors.

The steps/points and related functions described above in FIGS. 3, 4, and 5 are in no absolute chronological order, and some of the steps/points may be performed simultaneously or in an order differing from the given one. Other functions can also be executed between the steps/points or within the steps/points, and other signaling messages may be sent between the illustrated messages, and other transmissions of data may be sent between the illustrated transmissions. Some of the steps/points or part of the steps/points can also be left out or replaced by a corresponding step/point or part of the step/point.

The techniques described herein may be implemented by various means so that an apparatus implementing one or more functions described with an embodiment comprises not only prior art means, but also means for configuring a receiving node of a first wireless communications system co-located with a node of a second wireless communications system, said first and second wireless communications systems are configured with frequencies on a shared frequency band, means for receiving information identifying a node of the first wireless communications system transmitting on a frequency of the first wireless communications system, and means for transmitting to an entity controlling configuration of the shared frequency band between the first and the second wireless communications system information identifying the transmitting node as an interfering node to the co-located node of the second wireless communications system.

According to another aspect the techniques described herein may be implemented by various means so that an apparatus implementing one or more functions described with an embodiment comprises not only prior art means, but also means for receiving information from a receiving node of a first wireless communications system identifying a transmitting node of the first wireless communications system as an interfering node to a node of a second wireless communications system co-located with the receiving node, wherein the said first and second wireless communications system are configured with frequencies on a shared frequency band, and means for controlling configuration of the shared frequency band between the first and the second wireless communications system on the basis of the received information.

According to another aspect the techniques described herein may be implemented by various means so that an apparatus implementing one or more functions described with an embodiment comprises not only prior art means, but also means for determining a first configuration of a first wireless communications system with frequencies on a shared frequency band with a second wireless communications system, means for receiving information identifying a transmitting node of the first wireless communications system as an interfering node to a node of the second wireless communications system, and means for determining a second configuration of the first wireless communications system on the basis of the received information.

More precisely, the various means comprise means for implementing functionality of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

It will be obvious to a person skilled in the art that, as the technology advances, the inventive concept can be implemented in various ways. The invention and its embodiments are not limited to the examples described above but may vary within the scope of the claims.

The invention claimed is:

1. A method comprising:

configuring a receiving node of a first wireless communications system co-located with a node of a second wireless communications system, said first and second wireless communications systems are configured with frequencies on a shared frequency band, the second wireless communication system having a higher priority than the first wireless communication system, the priority indicating that transmissions from a transmitting node of the first wireless communication system received at a node of the second wireless communication system are interference;

receiving information identifying a transmitting node of the first wireless communications system;

transmitting on a frequency of the first wireless communications system;

transmitting to an entity controlling configuration of the shared frequency band between the first and the second wireless communications system information identifying the transmitting node as an interfering node to the co-located node of the second wireless communications system; and protecting the node of the second wireless communications system communicating on the frequency of the shared frequency band from interference originating from the first wireless communications system by co-locating the receiving node of the first wireless communications system with the node of the second wireless communications system.

2. A method according to claim 1, wherein the shared frequency band comprises a plurality of frequency blocks, a first part of the blocks being used by the node of the second wireless communications system, the method comprising:
determining a second part of the blocks for a configuration of the first wireless communications system by removing the first part of the blocks and a protection mask associated with each block; and
transmitting information identifying the second part of the blocks to the first wireless communications network.

3. A method according to claim 1, wherein a configuration of the first wireless communications system comprises frequencies associated with transmitting nodes of the first wireless communications system.

4. A method according to claim 1, wherein the shared frequency band comprises a plurality of frequency blocks, a first part of the blocks being used by the node of the second wireless communications system, the method comprising:
determining a second part of the blocks for a configuration of the first wireless communications system by removing the first part of the blocks and a protection mask associated with each block.

5. A method according to claim 1, wherein frequency bands of the first wireless communications system comprise the shared frequency band and a dedicated frequency band, the method comprising:
determining a first configuration a first wireless communications system with frequencies on a dedicated frequency band;
receiving information identifying a transmitting node of the first wireless communications system as an interfering node to a node of the second wireless communications system;
determining a second configuration the first wireless communications system with frequencies on a shared frequency band.

6. A method according to claim 1, wherein frequency bands of the first wireless communications system comprise the shared frequency band and a dedicated frequency band, the method comprising:
determining a difference of propagation characteristics of the shared frequency band and the dedicated frequency band; and
determining blocks of the shared frequency band for the second configuration on the basis of the determined difference.

7. A method according to claim 1, wherein the receiving node and the node of the second wireless communications system are separated by a distance and a safety margin is introduced to transmissions received from the transmitter of the first wireless communications system.

8. A method according to claim 1, wherein the first wireless communications system comprises a Fixed Satellite System and the second wireless communications system comprises a cellular communications system.

9. A method as in claim 1, wherein the receiving node of the first wireless communications system is separate from the transmitting node of the first wireless communications system.

10. A method comprising:
receiving information from a receiving node of a first wireless communications system identifying a transmitting node of the first wireless communications system as an interfering node to a node of a second wireless communications system co-located with the receiving node, wherein the said first and second wireless communications system are configured with frequencies on a shared frequency band, the second wireless communication system having a higher priority than the first wireless communication system, the priority indicating that transmissions from a transmitting node of the first wireless communication system received at a node of the second wireless communication system are interference;
controlling configuration of the shared frequency band between the first and the second wireless communications system on the basis of the received information, the node of the second wireless communications system communicating on a frequency of the shared frequency band from interference originating from the first wireless communications system being protected by co-locating the receiving node of the first wireless communications system with the node of the second wireless communications system.

11. A method according to claim 10 comprising:
determining a first configuration of a first wireless communications system with frequencies on a shared frequency band with a second wireless communications system;
receiving information identifying a transmitting node of the first wireless communications system as an interfering node to a node of the second wireless communications system;
determining a second configuration of the first wireless communications system on the basis of the received information.

12. An apparatus of a first wireless communication system being co-located with a node of a second wireless communication system, said first and second wireless communications systems being configured with frequencies on a shared frequency band, comprising at least one processor, and at least one memory including computer program code, the at least one memory and the computer program code configured to, with the at least one processor, cause the apparatus at least to:
receive information identifying a transmitting node of the first wireless communications system transmitting on a frequency of the first wireless communications system;
transmit to an entity controlling configuration of the shared frequency band between the first and the second wireless communications system information identifying the transmitting node as an interfering node to the co-located node of the second wireless communications system, the second wireless communication system having a higher priority than the first wireless communication system, the priority indicating that transmissions from a transmitting node of the first wireless communication system received at a node of the second wireless communication system are interference; and
protect the node of the second wireless communications system communicating on a frequency of the shared frequency band from interference originating from the first wireless communications system by co-locating the receiving node of the first wireless communications system with the node of the second wireless communications system.

13. An apparatus comprising at least one processor, and at least one memory including computer program code, the at least one memory and the computer program code configured to, with the at least one processor, cause the apparatus to at least:
  receive information from a receiving node of a first wireless communications system identifying a transmitting node of the first wireless communications system as an interfering node to a node of a second wireless communications system co-located with the receiving node, the second wireless communication system having a higher priority than the first wireless communication system, the priority indicating that transmissions from a transmitting node of the first wireless communication system received at a node of the second wireless communication system are interference;
  wherein the said first and second wireless communications system are configured with frequencies on a shared frequency band; and
  control configuration of the shared frequency band between the first and the second wireless communications system on the basis of the received information, the node of the second wireless communications system communicating on a frequency of the shared frequency band from interference originating from the first wireless communications system being protected by co-locating the receiving node of the first wireless communications system with the node of the second wireless communications system.

14. An apparatus according to claim 13, the at least one memory and the computer program code configured to, with the at least one processor, cause the apparatus further to:
  determine a first configuration of a first wireless communications system with frequencies on a shared frequency band with a second wireless communications system;
  receive information identifying a transmitting node of the first wireless communications system as an interfering node to a node of the second wireless communications system; and
  determine a second configuration of the first wireless communications system on the basis of the received information.

\* \* \* \* \*